Patented Aug. 2, 1932

1,870,063

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

REFINING OF PETROLEUM OILS

No Drawing. Application filed December 9, 1925, Serial No. 74,397. Renewed November 21, 1930.

This invention relates to improvements in the refining of petroleum oils, and refers more particularly to the treatment of the lighter gravity liquid products produced from the distillation and cracking of petroleum oils, by subjecting said liquid products to the refining action of certain refining agents to remove or convert the objectionable color-forming, odoriferous, sulphur and analogous objectionable compounds to produce a substantially water white, commercially desirable product having characteristics of gasoline or the like.

The present invention contemplates subjecting such gasoline-like products to the action of concentrated sulphuric acid spaced with various soluble salts or acids, or a combination of soluble salts or acids, as will hereinafter be more particularly described, it being particularly important to note that the spacing agent is substantially water free.

The invention is particularly directed to the treatment of those types of overhead products produced directly from the cracking system which have an end boiling point requiring no further distillation, as well as those lighter gravity products which are known as cracked distillates which require some redistillation before they become commercial products.

Ordinarily concentrated sulphuric acid may be spaced with soluble salts such as ammonium sulphate or by acids such as acetic acid (preferably glacial), chloracetic acid, orthophosphoric acid, pyrophosphoric acid, metaphosphoric acid, and gaseous ammonia, the latter, of course, forming ammonium sulphate which remains dissolved in the sulphuric acid, that is, it is the equivalent of dissolving ammonium sulphate (a salt) in the sulphuric acid.

As a feature of the invention, it is to be particularly noted that the spacing agent used in the present invention is substantially water free, that is, within the limits of commercial products; for example, glacial acetic acid, while in the pure state may contain no free water, in the commercial product may contain several percent of water. Further, salts like ammonium sulphate may contain some water of hydration chemically combined with salt. This is interpreted as being substantially free of mechanically held water.

It is to be particularly noted that the use of these spacing agents differs from the use of water, which is a diluting medium, in that the addition of water to sulphuric acid causes an ionization of the acid which is not the case with the aforementioned substances. The action of this ionized acid must of necessity be different from the acid in the systems making use of spacing agents. The purpose of these spacing agents is to cut down the reactivity of the sulphuric acid, especially in the treatment of cracked distillates. Concentrated sulphuric acid, in addition to its removal of undesirable substances in the refining of cracked distillates, reacts with other substances present in the cracked distillates in such manner as to produce undesirable products which, remaining in the treated oil, cause the latter to be unstable with respect to color and odor. The spacing agent prevents this reaction.

As an illustrative example of a mixture containing sulphuric acid and a spacing agent which has given satisfactory results, the following may be cited: 25% of glacial acetic acid mixed with 75% of concentrated sulphuric acid in conjunction with other refining agents mentioned above has produced a refined gasoline from a crude cracked end boiling point gasoline which was stable on exposure to sunlight and other conditions. The same cracked product treated with concentrated sulphuric acid containing no glacial acetic acid, under exactly comparable conditions of treatment and exposure, produced a product from this particular distillate which went badly off color.

It is, of course, understood that with certain types of lighter gravity liquid products, it will be possible to utilize the refining agent of the present invention as the sole refining agent. With other types of so-called cracked products, it will be advisable to subject them separately to the action of the refining agent of the present invention and also to the action of other refining agents such as copper salts in solution, alkalies, plumbite, earthy adsorbents e. g. fuller's earth and the like.

It is to be understood that I do not wish to limit myself to any particular order or succession of treatment as this will vary according to conditions and will be determined by a skilled worker experienced in the art.

I claim as my invention:

1. A step in a method of refining the lighter gravity liquid products obtained from the cracking of petroleum oil, comprising subjecting said liquid products to the action of sulphuric acid spaced with a substantially water free soluble organic acid of such a character as will not substantially decompose in the presence of sulphuric acid.

2. A process for refining hydrocarbon oil which comprises treating the same with concentrated sulphuric acid spaced with a substantially water-free organic acid capable of cutting down the reactivity of the sulphuric acid and of lessening undesirable reaction between the sulphuric acid and the oil.

3. A process for refining hydrocarbon oil which comprises treating the same with concentrated sulphuric acid spaced with glacial acetic acid.

JACQUE C. MORRELL.